US006931952B2

(12) United States Patent
Rantala et al.

(10) Patent No.: US 6,931,952 B2
(45) Date of Patent: Aug. 23, 2005

(54) DEVICE FOR IN-LINE MEASUREMENT OF PROPERTIES OF FLUID FLOWS IN PIPELINE SYSTEMS

(75) Inventors: Paul A. Rantala, Sudbury (CA); Andrew T. MacKenzie, Val Therese (CA)

(73) Assignee: Canadian Mining Industry Research Organization, Sudbury ( * ) Notice: Subject to any disclaimer, the term of this patent is extended or adjusted under 35 U.S.C. 154(b) by 298 days.

(21) Appl. No.: 10/276,444
(22) PCT Filed: Dec. 11, 2001
(86) PCT No.: PCT/CA01/01764
§ 371 (c)(1), (2), (4) Date: Nov. 18, 2002
(87) PCT Pub. No.: WO02/052238
PCT Pub. Date: Jul. 4, 2002

(65) Prior Publication Data
US 2004/0025607 A1 Feb. 12, 2004

(30) Foreign Application Priority Data
Dec. 22, 2000 (CA) ............................................. 2329504

(51) Int. Cl.⁷ .......................... F16L 55/40; F16L 55/48; G01K 1/14
(52) U.S. Cl. ........................ 73/866.5; 73/431; 73/865.8
(58) Field of Search ............................... 73/431, 865.8, 73/866.5; 15/104.03, 104.05, 104.061

(56) References Cited

U.S. PATENT DOCUMENTS

| 3,093,739 A | * | 6/1963 | Danforth et al. ............ 250/303 |
| 3,261,213 A | | 7/1966 | Zeldman et al. .............. 74/5.6 |
| 3,974,680 A | | 8/1976 | Beaver ....................... 73/40.5 |
| 4,016,748 A | * | 4/1977 | Boyens ..................... 73/40.5 R |
| 4,020,674 A | | 5/1977 | Fechter et al. ............... 73/40.5 |
| 4,835,717 A | | 5/1989 | Michel et al. ............... 364/558 |
| 4,844,165 A | | 7/1989 | Van Der Steeg ............ 166/367 |
| 4,894,539 A | * | 1/1990 | Hurst ......................... 250/303 |
| 4,945,775 A | * | 8/1990 | Adams et al. ............. 73/865.8 |
| 4,958,128 A | * | 9/1990 | Tomoyasu et al. .......... 324/559 |
| 5,084,764 A | * | 1/1992 | Day ............................. 348/84 |
| 5,152,179 A | | 10/1992 | Charrier ...................... 73/384 |
| 5,396,524 A | | 3/1995 | Lyman ....................... 376/246 |
| 5,506,505 A | * | 4/1996 | Worthen et al. ............ 324/326 |
| 6,241,028 B1 | | 6/2001 | Bijleveld et al. ............. 175/40 |
| 6,401,525 B1 | * | 6/2002 | Jamieson ................. 73/40.5 R |
| 2003/0121338 A1 | * | 7/2003 | Yates ........................ 73/865.8 |
| 2003/0160391 A1 | * | 8/2003 | McEwan ..................... 277/314 |

FOREIGN PATENT DOCUMENTS

| CA | 1276483 | 11/1990 | .......... E21B/21/06 |
| CA | 2218029 | 4/1999 | .......... G01B/21/08 |
| JP | 06269755 | 9/1994 | ............. B08B/9/04 |
| JP | 10238655 | 9/1998 | ............. F16L/1/00 |
| WO | WO 200016002 A1 * | 3/2000 | .......... F16L/55/48 |
| WO | WO 200170422 A1 * | 9/2001 | .......... B08B/00/00 |
| WO | WO 200186191 A1 * | 11/2001 | ............ F16J/15/10 |

* cited by examiner

Primary Examiner—Hezron Williams
Assistant Examiner—David A. Rogers
(74) Attorney, Agent, or Firm—George J. Primak

(57) ABSTRACT

A device called "pill" is provided for in-line measurement of properties, such as pressure and temperature, in a fluid flow within a pipeline system. The device is small enough to travel in the medium of the pipeline system in an unrestricted manner. It has at least one sensor to scan properties such as pressure and temperature at a desired rate. Also, the device includes a microprocessor for logging data scanned by the sensor so that it can later be downloaded and analysed by a PC. Moreover, the device has a buoyancy compensator for adjusting the specific gravity of the device to make it compatible with the medium in which it travels. The novel device is particularly suitable for use in solids transport systems, such as mining backfill systems.

12 Claims, 2 Drawing Sheets

DEVICE FOR IN-LINE MEASUREMENT OF PROPERTIES OF FLUID FLOWS IN PIPELINE SYSTEMS

FIELD OF THE INVENTION

This invention relates to a device for measuring properties and phenomena, such as pressure and temperature, of fluid flows in pipeline systems, particularly in solids transport pipeline systems, such as mining backfill systems, concrete piping systems and similar paste and slurry systems. More specifically, it relates to a device which travels within the pipeline with the flow of the fluid, paste or slurry and scans the desired properties and flow characteristics at a predetermined rate, as well as stores them for subsequent computer readout and analysis.

BACKGROUND OF THE INVENTION

There are a number of devices known in the art, usually called "pigs", which are adapted to travel through the pipeline with the fluids, such as crude oil, and measure pressure drops in the pipeline to detect leaks therein. Examples of such devices are disclosed in U.S. Pat. Nos. 3,974,680 and 4,020,674. Such pigs are large devices encompassing essentially the entire internal circumferential space within the pipeline, and they normally run only in clean, unrestricted pipelines that transport clear fluids. They would not be suitable for pipelines transporting solids where they would quickly become clogged and inoperative.

Another "intelligent pig" is disclosed in Canadian Patent Application No. 2,218,029 published Apr. 10, 1999, where the body of the pig is surrounded with soft foam and a sensor is connected to said body to measure wax deposits in the pipeline. It requires that the body of the device should at least partially block the flow of fluid within the pipeline. Again, such device takes up essentially the entire circumferential space within the pipeline as it travels and it would not be suitable for paste or slurry pipeline systems where it would be quickly damaged.

There has long been a need for mine operators to better understand flow rheology particular to their backfill systems. A considerable amount of effort and money has been spend to identify and remedy the cause and effect of waterhammer, cascades, impact points, adiabatic heating and the effects of vugs, vacuums, line restrictions and pressure spikes during mining backfill operations. Similar problems arise in other solids transport systems, such as used for concrete piping and the transport of other pastes or slurries. Until now they remained without solution. There is thus a need for a device that would provide in-line measurement of properties of fluids transported by pipelines and especially in solids transport pipeline systems that would allow the operator to quickly calculate friction loss or deduce anomalies in the system.

OBJECTS AND SUMMARY OF THE INVENTION

It is an object of the present invention to provide a device (herein called a "pill") which will freely travel within the fluid transported by pipeline, including solids transport pipeline systems, and effect scans of desired properties, characteristics or phenomena during such travel at a predetermined rate.

Another object is to use the pill to analyse the data obtained thereby within the transporting pipeline system to determine the condition of the flow and/or anomalies in the system.

Other objects and advantages of the present invention will be apparent from the following description thereof.

In essence, the device of the present invention comprises a housing which is small enough for unrestricted travel within a pipeline system, including solids transport pipeline system, and within which there are provided at least one sensor that communicates with the outside medium and reads or scans the property or condition of the medium in which it travels, and an electronics package, including a microprocessor powered by an on-board power source for logging and storing the data generated by the sensor(s). The novel device also includes means for adjusting its specific gravity to be compatible with the medium in which it travels, so that it may be blended with the medium and travel essentially at the same velocity as the medium in the pipeline.

The device or pill of the present invention is much smaller than the "pigs" of the prior art. Its diameter represents only a fraction of the diameter of the pipeline and in no way does it restrict the flow of material through the pipeline as is the case of some prior art. As it travels in the pipeline, the pill measures absolute pressure, temperature or other properties rather than, as in the prior art, a relative pressure or pressure drop measured in a chamber isolated from the stream of the medium in which the device travels. This is a fundamental distinction between the prior art and the present invention.

Another fundamental difference resides in providing the pill of the present invention with a buoyancy compensator, which may consist of an air pocket within the device and which allows to adjust the specific gravity of the device to essentially correspond to that of the medium in which it travels. The specific gravity of the device can thus be adjusted to control its travelling speed and to make the device neutrally buoyant.

Apart from the microprocessor, the electronics package includes a switch used to switch the microprocessor data logger on and off as required, and a mating connector which can connect the microprocessor chip to a computer via a serial port to download and read the data.

Also, the electronics normally include an A/D converter and a thermistor to compensate for the temperature variation. The sampling rate is user defined and may, for example, range from 10 scans per second to only a few scans during the entire residence time of the pill in the pipeline. The data output may be configured to display either unprocessed integers or computed values. Logged data may be downloaded to a PC using any basic terminal program. Such data may then be compared to the system's layout and allow the operator to quickly calculate friction loss, or deduce anomalies in the system. The system can thus be handled with the knowledge of the factual rheological data for every section of the transporting pipeline.

Various sensors can be used to detect various properties and/or characteristics of the medium in which the pill travels. Thus, pressure can be read by means of a semiconductor strain gauge; temperature by a thermistor sensor; flow characteristics, e.g. laminar, turbulent, plug flow and the like, by means of a miniature gyro; effects of surging flow and water hammer can be determined by using an accelerator as a sensor; and proximity sensors can be used in the pill and on the pipeline to determine the moment when the pill passes by the sensor on a fixed pipe, or to determine the velocity of the pill in the fluid medium when two or more proximity sensors are placed on the pipe in predetermined locations. Other types of sensors for determining particular properties or characteristics of the fluid, paste or slurry transported in a pipeline can also be used within the scope of the present invention.

BRIEF DESCRIPTION OF THE DRAWINGS

A preferred embodiment of the invention will now be described with reference to the appended drawings, in which.

DETAILED DESCRIPTION OF THE PREFERRED EMBODIMENT

Figure 1:
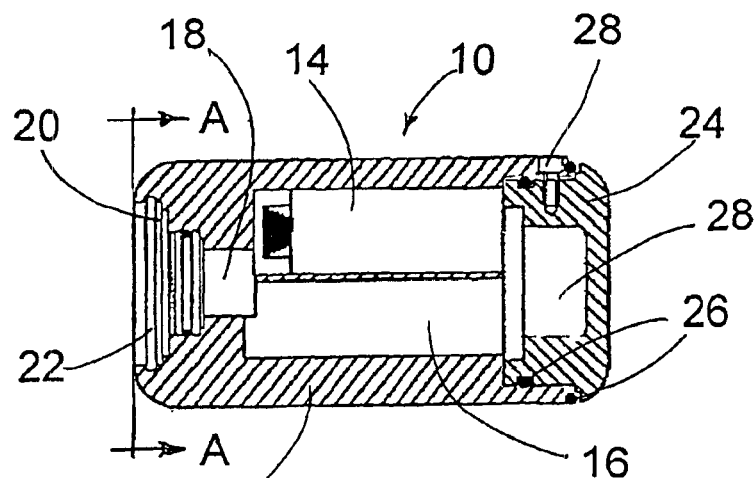
FIG. 1 is a section view of a pill according to the present invention.

Referring to the drawings in which the same elements are designated by the same reference numbers, FIG. 1 illustrates the novel device or pill 10. The dimensions of the pill could be those actually shown in FIG. 1, although the pill is not limited to any specific dimensions and, for example, smaller dimensions than those shown in FIG. 1, could be used. The pill 10 comprises a housing 12, which can be made of aluminum, stainless steel or any other suitable material, with space 14 within the housing being reserved for a power source, such as a battery, and space 16 for the electronics package. At the front end of the housing 12, there is provided a sensor 18 which extends outwardly and is protected by a protective mesh 20 held in place by a retaining ring 22. At the rear end, housing 12 is closed with an end cap 24 which provides a watertight closure by means of O-rings 26 and screw 28.

Within the end cap 24, there is provided a space 28 which acts as a buoyancy compensator to adjust the pill to a desired specific gravity which, for example, can be similar to the specific gravity of the medium in which the pill will travel. This space 28 can be increased or decreased as desired, for instance by providing a different end cap, to achieve a predetermined specific gravity of the pill compatible with that of the medium. Such buoyancy compensator can also be provided elsewhere within the housing 12.

Figure 2:
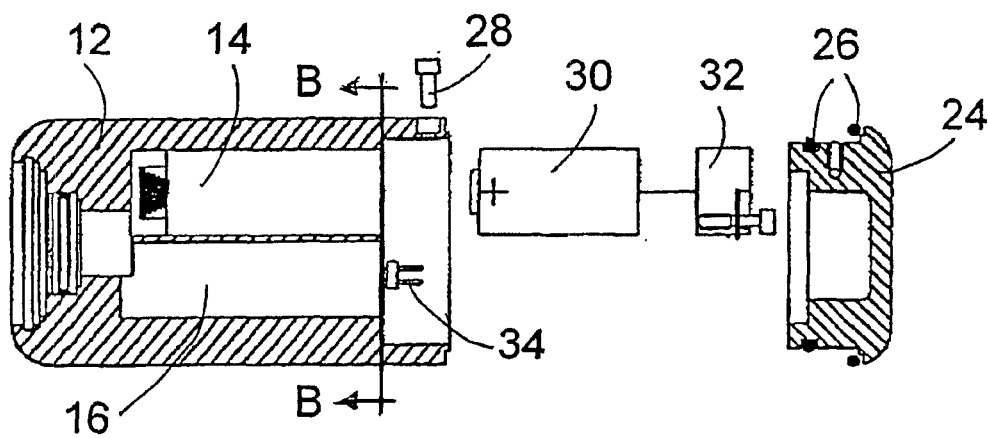
FIG. 2 is an expanded section view of the pill of FIG. 1, with the end cap open.

FIG. 2 illustrates the pill with the end cap 24 open and away from the hosing 12. To power the device, battery 30, which may for instance be a 6 V #L544 lithium battery, is inserted into the battery compartment 14 and held therein by a battery retainer 32. The microprocessor contained in the electronics compartment 16 is provided with a communication port 34 which can be connected to a PC for data readout.

The end cap 24 provides a tight closure of the housing 14 with O-rings 26 and is locked in closed condition by the screw 28.

Figure 3:
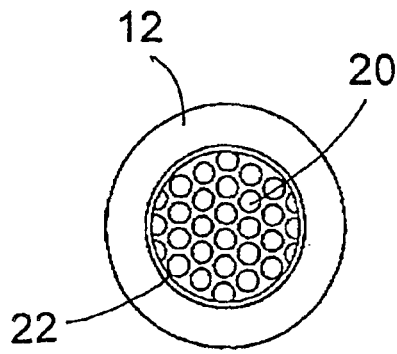
FIG. 3 is the front view of the pill of FIG. 1 along line A—A.

The front end of the housing 12 is shown in FIG. 3, which represents the view along line A—A of FIG. 1, and which illustrates the protective mesh 20 providing access to the sensor and the retainer 22 which retains the mesh 20 in place.

Figure 4:
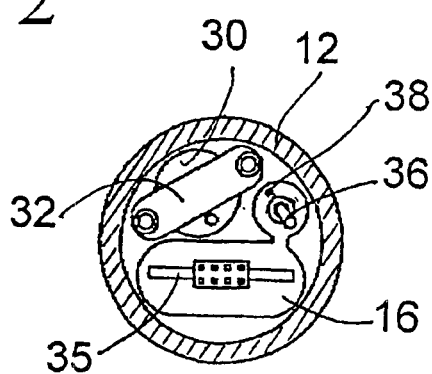
FIG. 4 is a view of the pill of FIG. 2 along line B—B.

FIG. 4 shows section B—B of FIG. 2, and illustrates the interior of the housing 12, including the battery 30 retained by the battery retainer 32, a microprocessor 35 mounted within the electronics compartment 16 and a switch 36 which is usually an on/off toggle switch that turns on and off the microprocessor data logger that begins recording the values obtained by the sensor at a preset rate. The red dot 38 indicates when power is on.

Figure 5:
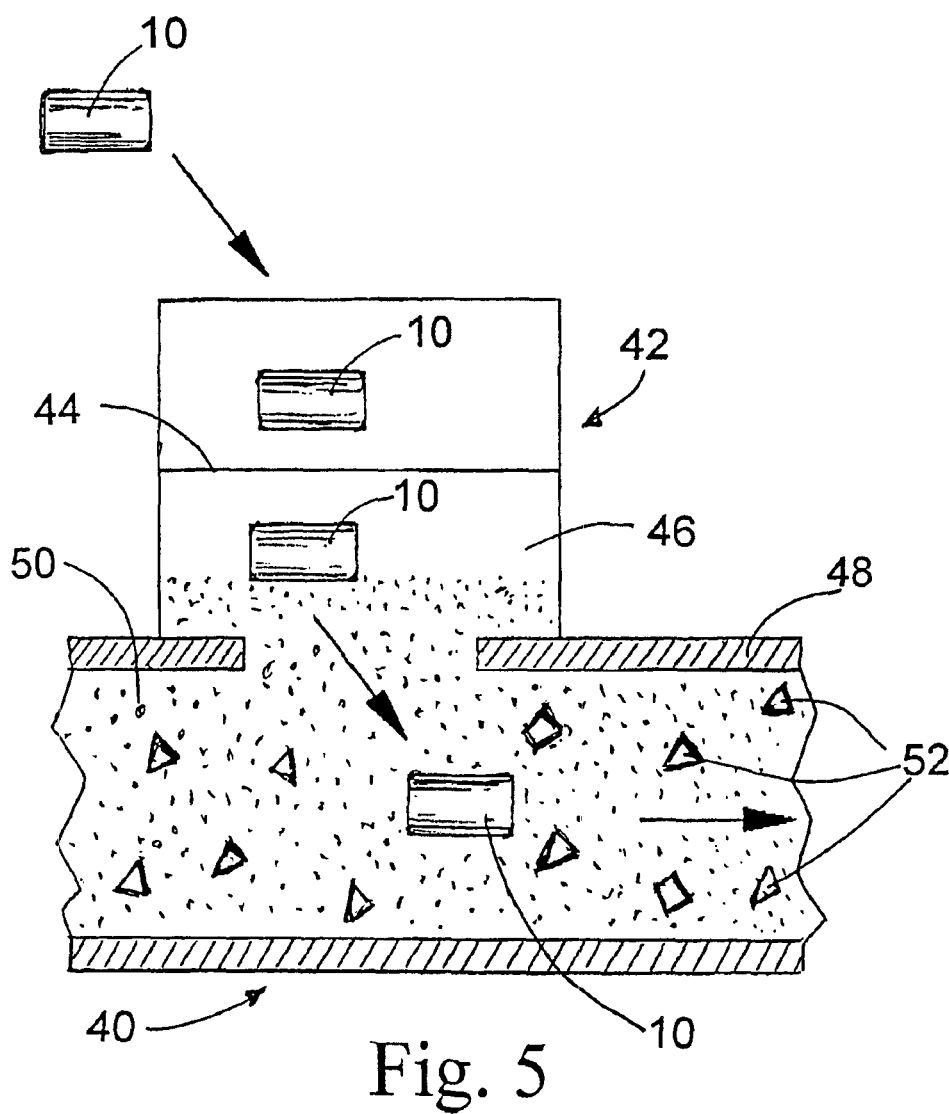
FIG. 5 is a view of an arrangement illustrating introduction of the pill of the present invention into a pipeline transporting a slurry.

In FIG. 5, the procedure for injecting the pill 10 into the pipeline 40 is illustrated. In this particular embodiment, pill 10 is introduced into an insertion port 42 having a pressure isolation lock 44. Here, pill 10 penetrates into a pressurized compartment 46 from which it is fed into the pipeline 40 through an opening in the pipe wall 48. In this case, the pipeline 40 transports a slurry of mining backfill 50 which normally has a specific gravity from 1.5 to 3, and pill 10 has been adjusted by the buoyancy compensator to have a specific gravity of 2.4, which is compatible with that of the backfill 50, that may also contain small rocks 52 and other solid particles having a diameter of up to about 2.5 cm (1 inch). The pipes used for the pipeline 40 will usually have diameters between 5 cm and 25 cm (2–10 inches) and flow rates from about 0.3 to 3 meters/sec (1 to 10 ft./sec). It should be noted that pill 10 can also be simply dropped into the hopper at the top of the piping system, if convenient.

The on-board microprocessor used in this particular example and contained in the pill 10 is CMOS based microprocessor with 64 Kbytes of data storing memory for storing the instrument's calibration coefficient and an A/D converter with 1 part in 65000 count resolution. It also has 32 Kbytes of internal RAM that will store 16,000 scans of data. The output is, in this case, standard ASCII RS-232 and the data output may be unprocessed integers or computed values.

In most cases, the sensor(s) will include a pressure sensor which is a semiconductor strain gauge capable of recording pressures from full vacuum to as high as 21.3 Mpa (3100 psi). It may include an on-board thermistor mechanically attached to the pressure sensor, which allows the microprocessor to temperature compensate the pressure data to an accuracy of ±0.15% of full scale pressure.

Figure 6:
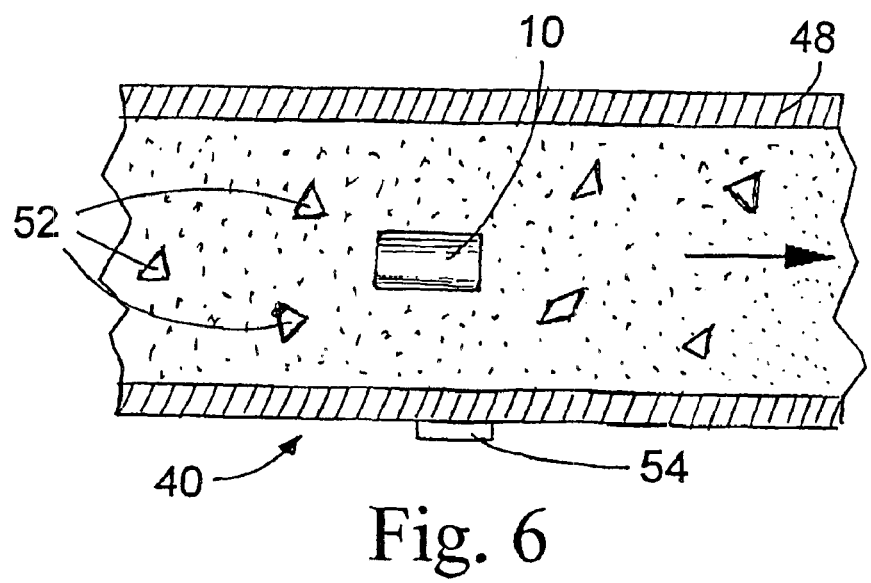
FIG. 6 is a view of the pill travelling within the pipeline transporting a slurry.

As previously mentioned, other sensors can be used if and when desired. For example, a proximity sensor can be incorporated within the pill 10 and also mounted on the outside of the pipe wall 48 as shown by sensor 54 in FIG. 6. This allows to determine exactly the moment when the pill 10 passes the proximity sensor 54 mounted on the fixed pipe. If two or more sensors 54 are mounted on the pipeline, the velocity of the pill in the fluid stream can be determined. At the exit from the pipeline 40, pill 10 will be retrieved using a catcher device (not shown), such as a steel or synthetic grill or mesh which allows the fluid and smaller solid particles to pass through, but will capture the pill. Such catcher device is normally suspended from the pipe or from above so that it does not obstruct nor create back pressure in the material flowing in the pipeline.

Once retrieved, pill 10 is cleaned and opened by removing end cap 24. A serial link is then made to a PC through the communication port 34 and the data logged in the microprocessor is downloaded for analysis. Any suitable PC software, such as Windows hyperterminal can be used for this purpose. When this has been accomplished, the microprocessor is cleared of old data, turned-on to initiate recording, then sealed with the end cap 24 and re-used in the pipeline system.

Although the device or pill of the present invention is particularly suitable for use in pipelines transporting solids, such as slurries and pastes, it can obviously also be used in pipelines with any fluid flows where it is desirable to collect data on properties such as absolute pressure, temperature and the like. The novel device is distinct from and more convenient than any similar device or pig disclosed in the prior art.

What is claimed is:

1. A device for in-line measurement of properties or phenomena in a fluid flow within a pipeline system, which comprises:
   (a) a housing which is small enough for unrestricted travel in a medium flowing in the pipeline system;
   (b) at least one sensor mounted in the housing and communicating with the medium flowing in the pipeline, said sensor being adapted to scan desired properties and/or characteristics of the medium at a predetermined rate;
   (c) a microprocessor contained in the housing for logging data generated by the sensor and storing it in a memory, said microprocessor being provided with a communications port for connecting it to a computer;
   (d) said housing also having a space for a power source which, when inserted into said space and switched-on, powers the microprocessor;
   (e) a removable cap for effecting a watertight closure of the housing when the device travels in the pipeline system and allowing access to the microprocessor when the device is out of the pipeline system; and
   (f) a buoyancy compensator provided within the housing an/or the cap for adjusting specific gravity of the device to a desired value.

2. A device according to claim 1, in which the sensor includes a pressure sensor.

3. A device according to claim 1, in which the sensor includes a temperature sensor.

4. A device according to claim 1, in which the sensor includes a gyro to record orientation of the device when it travels in the pipeline system.

5. A device according to claim 1, in which the sensor includes a micro-accelerometer.

6. A device according to claim 1, in which the sensor includes a proximity sensor and at least one proximity sensor is also provided on the pipeline system.

7. A device according to claim 1, in which the microprocessor includes a data storing memory, an A/D converter and a RAM that is capable of storing at least 16.000 scans of data.

8. A device according to claim 1, in which a battery is provided within the housing as the power source and a switch is provided to activate the battery.

9. A device according to claim 1, in which the buoyancy compensator is an air pocket provided within the housing and/or the cap.

10. A device according to claim 1, in which the housing and the cap are made of stainless steel or aluminum and have a diameter that is a fraction of the pipeline diameter.

11. Method of use of the device claimed in claim 1, in a solids transport pipeline system, which includes retrieval of the device from the pipeline system upon completion of its run, removal of the cap, connection with a computer and downloading and analysis of the data logged and stored in the microprocessor.

12. Method according to claim 11, in which the solids transport pipeline system is a mining backfill system.

* * * * *